(12) United States Patent
Zhang et al.

(10) Patent No.: US 8,031,967 B2
(45) Date of Patent: Oct. 4, 2011

(54) VIDEO NOISE REDUCTION

(75) Inventors: Cha Zhang, Sammamish, WA (US); Zhengyou Zhang, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1141 days.

(21) Appl. No.: 11/765,029

(22) Filed: Jun. 19, 2007

(65) Prior Publication Data

US 2008/0317371 A1     Dec. 25, 2008

(51) Int. Cl.
*G06K 9/40* (2006.01)
(52) U.S. Cl. ........ 382/275; 382/261; 382/264; 348/607; 348/606; 348/701; 348/533
(58) Field of Classification Search ........................ None
See application file for complete search history.

(56) References Cited

U.S. PATENT DOCUMENTS

| | | | |
|---|---|---|---|
| 5,107,340 A | 4/1992 | Hirata et al. | |
| 5,241,387 A | 8/1993 | Fujikawa et al. | |
| 5,309,237 A * | 5/1994 | Singh | 348/607 |
| 5,389,978 A | 2/1995 | Jeong-Hun | |
| 6,005,626 A * | 12/1999 | Ding | 375/240.16 |
| 6,771,793 B1 * | 8/2004 | Yamada | 382/264 |
| 7,034,632 B2 | 4/2006 | Gomez et al. | |
| 7,176,939 B2 | 2/2007 | Weitbruch et al. | |
| 7,437,013 B2 * | 10/2008 | Anderson | 382/261 |
| 2004/0131117 A1 * | 7/2004 | Sheraizin et al. | 375/240.12 |
| 2005/0128355 A1 * | 6/2005 | Kang et al. | 348/606 |
| 2005/0135700 A1 * | 6/2005 | Anderson | 382/261 |
| 2005/0248687 A1 | 11/2005 | Lee et al. | |
| 2006/0103765 A1 * | 5/2006 | Zhou et al. | 348/701 |
| 2006/0132624 A1 | 6/2006 | Yuyama | |
| 2006/0221249 A1 | 10/2006 | Lin et al. | |
| 2007/0024748 A1 * | 2/2007 | Kubota | 348/533 |
| 2008/0123740 A1 * | 5/2008 | Ye | 375/240.11 |
| 2010/0008423 A1 * | 1/2010 | Namboodiri et al. | 375/240.16 |

FOREIGN PATENT DOCUMENTS

EP        0772348 A3      11/2005
(Continued)

OTHER PUBLICATIONS

Pizžurica, A., V. Zlokolica, W. Philips, Noise reduction in video sequences using wavelet-domain and temporal filtering, Proceedings of the Int'l Society for Optical Eng'g (SPIE) Wavelet Applications in Industrial Processing, 2004, pp. 48-49, vol. 5266, Edited by Truchetet, Frédéric.

(Continued)

*Primary Examiner* — Anand Bhatnagar
*Assistant Examiner* — Tsung-Yin Tsai
(74) *Attorney, Agent, or Firm* — Lyon & Harr, LLP; Richard T. Lyon

(57) ABSTRACT

A video noise reduction technique is presented. Generally, the technique involves first decomposing each frame of the video into low-pass and high-pass frequency components. Then, for each frame of the video after the first frame, an estimate of a noise variance in the high pass component is obtained. The noise in the high pass component of each pixel of each frame is reduced using the noise variance estimate obtained for the frame under consideration, whenever there has been no substantial motion exhibited by the pixel since the last previous frame. Evidence of motion is determined by analyzing the high and low pass components.

20 Claims, 9 Drawing Sheets

FOREIGN PATENT DOCUMENTS

WO    WO 2005029846 A1 *    3/2005

OTHER PUBLICATIONS

Jostschulte, K., A. AMER, M. Schu, H. A. Schroder, Subband based spatio-temporal noise reduction technique for interlaced video signals, Int'l Conf. on Consumer Electronics, Jun. 2-4, 1998, pp. 438-439.

Amer, a., H. Schroder, a new video noise reduction algorithm using spatial subbands, Proceedings of the Third IEEE Intl Conf. On Electronics, Circuits, and Systems, Icecs, Oct. 13-16, 1996, pp. 45-48, vol. 1.

* cited by examiner

VIDEO NOISE REDUCTION

BACKGROUND

Online video conferencing has attracted more and more interest recently due to the improvements in network bandwidth, computer performance and compression technologies. Webcams are getting popular with home users, allowing them to chat with families and friends over the Internet for free. However, the quality of webcams varies significantly from one to another. Beside common issues caused by poor lighting conditions and sensor color drifting/desaturation, low-end webcams often exhibit significant sensor noises. These noises are visually annoying, and can have negative impact on many post processing algorithms such as compression, object tracking/recognition, among others.

SUMMARY

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present technique for video noise reduction generally involves first decomposing each frame of the video into low-pass and high-pass frequency components. Then, for each frame of the video after the first frame, an estimate of the noise variance in the high pass component is obtained. This is followed by reducing the noise in the high pass component of each pixel for each frame using its obtained noise variance estimate whenever there has been no substantial motion exhibited by the pixel since the last previous frame. Evidence of motion is determined by analyzing the high and low pass components.

The foregoing general video noise reduction technique can also be implemented in schemes where motion compensation techniques are employed to produce reference and predicted frames (and sometimes bi-directional frames). These techniques involve the use of motion vectors that can be used to assist in the noise reduction process. Still further, in cases where the transmittal of the frames of a video can be delayed, or the video can be processed offline, a backward updating operation based on the present technique can be applied to eliminate possible ghost effects caused by occluded regions.

It is noted that while the foregoing limitations in existing video systems described in the Background section can be resolved by a particular implementation of the present video noise reduction technique according to the present invention, this is in no way limited to implementations that just solve any or all of the noted disadvantages. Rather, the present technique has a much wider application as will become evident from the descriptions to follow.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present video noise reduction technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
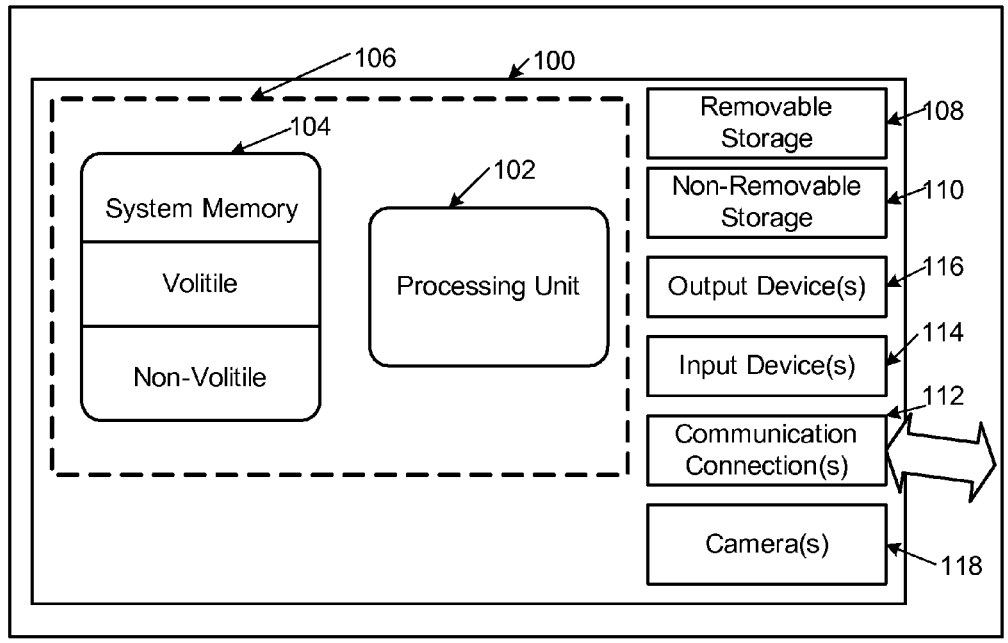
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present video noise reduction technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present video noise reduction technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present video noise reduction technique.

2.0 The Video Noise Reduction Technique

The present technique provides an effective and efficient way to reduce the noise in the frames of a video. After noise reduction, the video can be fed into a video encoder where it has been found there can be saving in bit rate of around 5-75% depending on the original video noise level.

Figure 2:
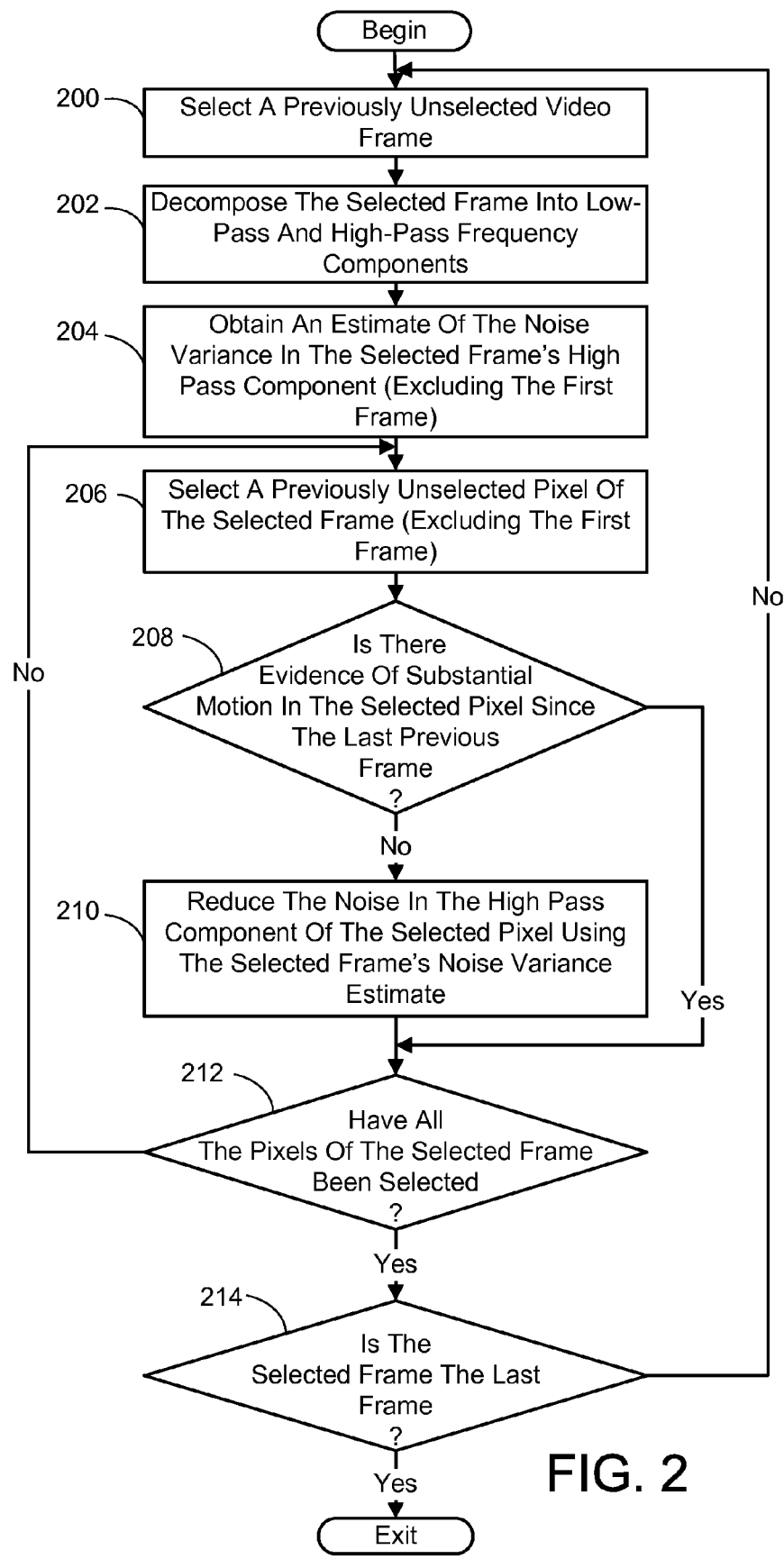
FIG. 2 is a flow diagram generally outlining one embodiment of a process for reducing noise in the frames of a video in accordance with the present video noise reduction technique.

In general, the present technique decomposes videos into low and high frequency components, and reduces the noise in the high-pass component. In one embodiment, this is implemented as shown in FIG. 2. The procedure begins by selecting a frame of the video (200) and then decomposing the selected frame into low-pass and high-pass frequency components (202). In addition, for each frame after the first, an estimate of the noise variance in the high pass component of the selected frame is obtained (204). A previously unselected pixel of the selected frame (excluding the first) is then selected (206), and it is determined if there is evidence of any substantial motion associated with the selected pixel since the last previous frame (208). Generally this can be accomplished by analyzing the high pass component of the selected pixel in the current frame, and the low pass component of the selected pixel in the current and previous frame. If substantial motion has not occurred, the noise is reduced in the high pass component of the selected pixel using the noise variance estimate (210). Otherwise the high pass component of the selected pixel is not changed. It is then determined if all the pixels of the selected frame have been selected (212). If not, actions 206 through 212 are repeated. When all the pixels have been considered, it is determined if the selected frame is the last frame (214). If it is not, the procedure is repeated by repeating actions 200 through 214. If it is the last frame, the procedure ends.

As noted, the foregoing technique can employ the low pass components in the current and preceding frame in order to determine if motion has occurred and so whether a particular pixel under consideration will undergo noise reduction. This unique aspect of the technique, among others, will be described in more detail in the sections to follow.

In addition, it is noted that the foregoing technique employs a unique and simple model for automatically estimating the noise variance in the high pass component. This will also be described in more detail in the sections to follow.

2.1 Decomposing a Video Frame

In one embodiment of the present video noise reduction technique, each frame of the video is decomposed into low-pass and high-pass frequency components by first generating the low pass component $l_{low}(t)$ for each pixel using a low pass filter (where t refers to the frame number). For example, a box filter or Gaussian filter could be used. The high pass component $l_{high}(t)$ for each pixel is then generated by subtracting the low pass component of the pixel from the original pixel of the video frame under consideration. Thus, $$l_{high}(t) = l(t) - l_{low}(t). \qquad (1)$$

2.2 Finding Evidence of Substantial Motion

As indicated previously, noise reduction is applied to a pixel in a frame only when there has not been substantial motion exhibited by that pixel based in part on the pixel's condition in the immediately preceding frame. This motion determination is generally accomplished on a pixel-by-pixel basis using both the low pass and high pass components by determining if two conditions are met. First, it is determined whether the pixel under consideration satisfies a condition that the absolute value of the difference between the high pass component pixel value and an initial value of $I_{est}$ is less than a first prescribed multiple of the noise variance estimate. $I_{est}$ represents an estimate of the high pass component intensity of the pixel under consideration as it would exist without noise. The aforementioned first prescribed multiple can generally range between about 3 and 5, however, a value of 5 was used with success in tested embodiments of the present technique. Thus, for tested embodiments, the first condition involved whether:

$$|I_{high}(t)-I_{est}(t-1)|<5\delta, \tag{2}$$

where $\delta$ is the aforementioned noise variance estimate.

The second condition involves, for the pixel under consideration, whether the absolute value of the difference between the low pass component associated with the current frame and the low pass component computed for the frame immediately preceding the current frame is less than a second prescribed multiple of the noise variance estimate. The second prescribed multiple can generally range between about 0.5 and 2.0, however, a value of 1.25 was used with success in tested embodiments of the present technique. Thus, for tested embodiments, the second condition involved whether:

$$|I_{low}(t)-I_{low}(t-1)|<1.25\delta, \tag{3}$$

where $I_{low}(t-1)$ refers to the low pass component of the correspondingly located pixel in the frame coming just before the current frame being processed.

The first condition ensures the noise associated with a pixel is not too large as to make the motion determination unfeasible. The second condition ensures there has been no big intensity changes, which would be indicative of motion.

Each pixel in each frame after the first frame (t=0) of the video is tested using the foregoing two conditions. For the second frame (t=0) of the video, $I_{est}$ is initialized as the high pass component of the correspondingly-located pixel in the first frame (i.e., $I_{est}=I_{high}(t=0)$). As will be described shortly, it may be refined as part of the noise reduction procedure. For all subsequent frames, the initial $I_{est}$ for a pixel is set to the final $I_{est}$ of the correspondingly-located pixel of the immediately preceding frame, and is used to determine if the foregoing conditions are satisfied. In the preceding equations, as well as those to follow, the initial $I_{est}$ for a frame will be designated as $I_{est}(t-1)$ since it comes from the immediately preceding frame (t-1). Likewise, the final $I_{est}$ for a frame will be designated as $I_{est}(t)$.

As for the noise variance estimate $\delta$, it is initialized for use in the second frame as a prescribed value. This value can range between about 3 and 20, depending on the prior knowledge about the noise level. However, in tested embodiments a value of 10 was employed with success. For all subsequent frames, $\delta$ is computed as will be described shortly. It is noted that a single estimate of $\delta$ is used for all the pixels of a frame for efficiency.

If a pixel satisfies both the foregoing conditions it is deemed that no substantial motion has occurred since the immediately preceding frame. Otherwise, it is deemed that substantial motion has occurred.

2.3 Reducing the Noise

If a pixel exhibits evidence of substantial motion, the noise associated with the high pass component of that pixel cannot be reduced. However, if no substantial motion is evident, this noise can be reduced. Given this, the following technique can be used to reduce the noise in the high pass component of a pixel under consideration using the noise variance estimate.

Figure 3:
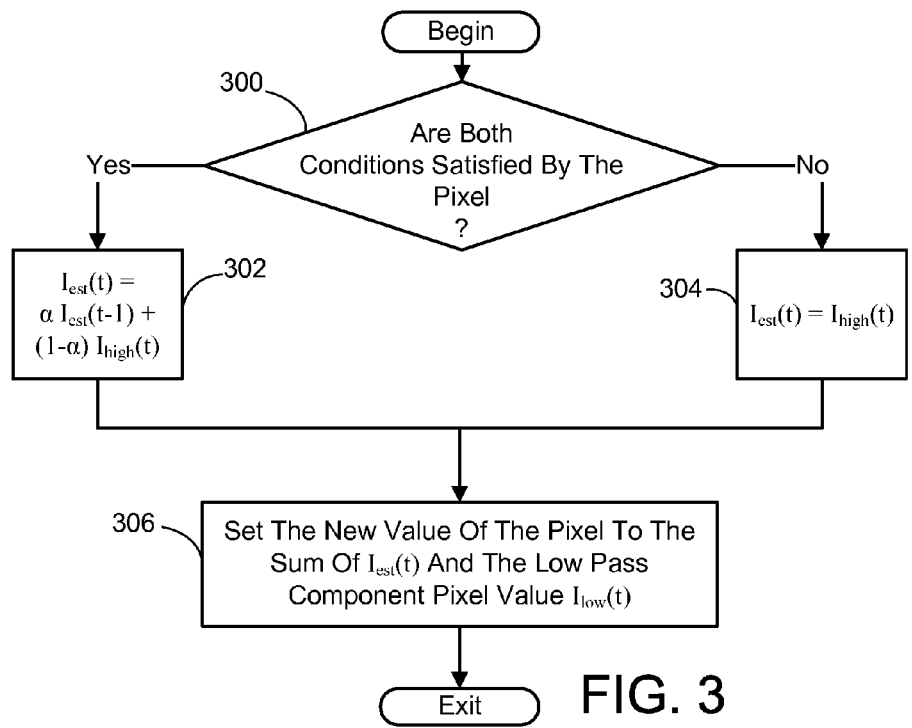
FIG. 3 is a flow diagram generally outlining one embodiment of a process for reducing noise in the high pass component of a video frame on a pixel by pixel basis when no substantial motion is exhibited by the pixel as part of the present video noise reduction technique.

Referring to FIG. 3, for each pixel of a video frame under consideration, in one embodiment it is first determined whether both of the previously-described conditions are satisfied by the pixel (300). If so, the $I_{est}$ is set to a value representing the product of the initial $I_{est}$ and a prescribed weighting factor $\alpha$, added to the product of one minus the weighting factor and the high pass component pixel value (302). Thus, for each pixel, $$I_{esti}(t)=\alpha I_{est}(t-1)+(1-\alpha)I_{high}(t). \tag{4}$$

If either condition is not met, then the final $I_{est}$ for the pixel under consideration is set to the high pass component pixel value $I_{high}(t)$ of the pixel (304). The value of the pixel under consideration is then set to a pixel value representing the sum of the final $I_{est}$ and the low pass component pixel value (306). Thus, for each pixel in the frame under consideration, $$I'(t)=I_{est}(t)+I_{low}(t), \tag{5}$$

where $I'(t)$ is a noise reduced pixel value.

In one embodiment of the present video noise reduction technique, the prescribed weighting factor $\alpha$ is set as $N/(N+1)$, where N is number of consecutive frames back from and including the current frame where the pixel satisfies both the aforementioned first and second conditions (i.e., exhibited no substantial motion). In an alternate embodiment a prescribed fixed value of the weighting factor is used for convenience. For example, in tested embodiments, a fixed a value of ⅞ was employed for the weighting factor.

2.4 Estimating the Noise Variance

As indicated previously, a noise variance estimate is obtained for each frame considered after the first frame of the video, and this estimate is used in the calculation associated with the next frame in determining whether a pixel satisfies the aforementioned first and second conditions. As indicated previously, the estimate is obtained from the immediately preceding frame. The noise variance is estimated for the immediately preceding frame as follows.

Figure 4:
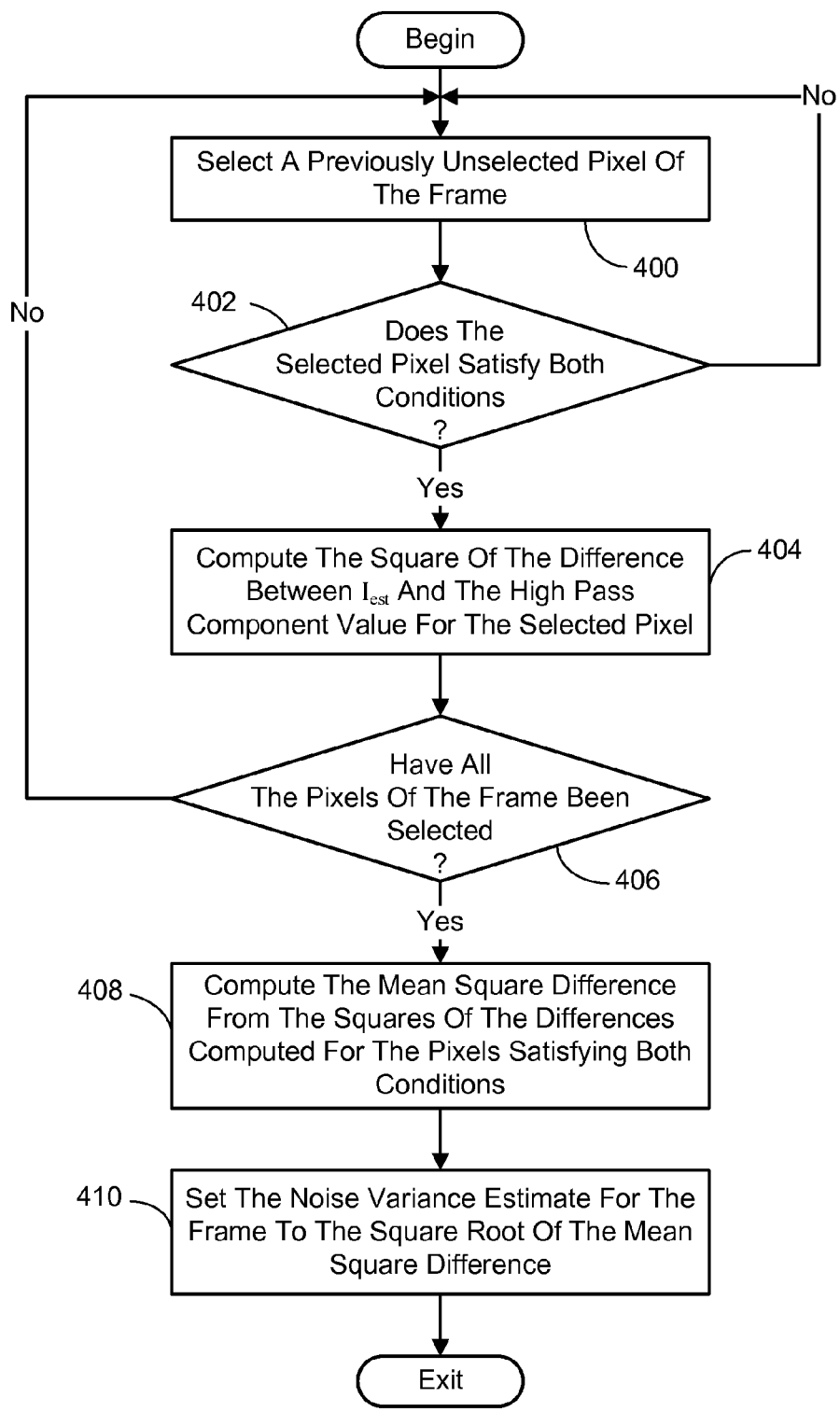
FIG. 4 is a flow diagram generally outlining one embodiment of a process for computing the noise variance estimate for each frame of a video as part of the present video noise reduction technique.

In one embodiment of the present technique, the noise variance estimate is computed for each frame (after the first) as shown in FIG. 4. First, a previously unselected pixel of the frame under consideration is selected (400). It is then determined if the selected pixel satisfies both the first and second conditions (402). If not, the next pixel is considered by repeating actions 400 and 402. If the pixel does satisfy both conditions, then the square of the difference between the $I_{est}$ and the high pass component value for the selected pixel is computed (404). It is then determined if all the pixels of the frame under consideration have been selected and processed (406). If not, then actions 400 through 406 are repeated. When all the pixels have been considered as described above, a mean square difference is computed from the squares of the differences computed for the pixels satisfying both the first and second conditions (408). The noise variance estimate for the frame under consideration is then set to a value representing the square root of the mean square difference (410). Thus, $$\delta=sqrt(\text{mean}\{(I_{est}-I_{high}(t))^2\} \tag{6}$$

3.0 The Video Noise Reduction Technique with Motion Information Available

Modern video codecs make use of similarity across frames to improve coding efficiency, often termed motion compensation. Generally speaking, in motion compensation there are reference frames and predicted frames. Predicted frames are first predicted from the reference frames using motion vectors, and the residue is then coded. If motion vectors are available, it is possible to extend the present technique to provide noise reduction in both the reference and predicted frames of a video. In general, the technique is the same except that the $I_{est}$ from the reference frames is used to construct an initial $I_{est}$ for its associated predicted frames based on the motion vectors.

Figure 5A:
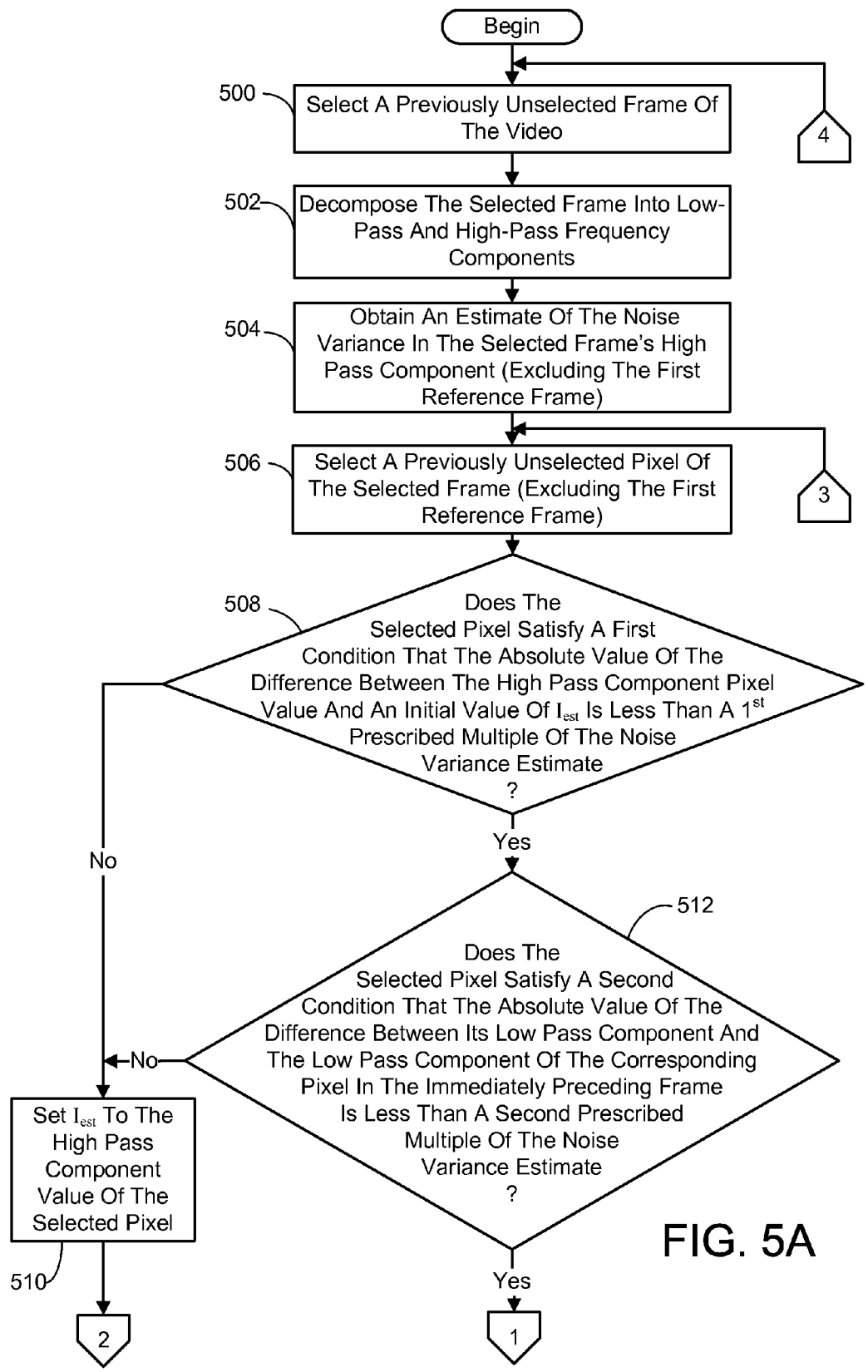
FIGS. 5A-B are a continuing flow diagram generally outlining one embodiment of a process for reducing noise in the frames of a video encoded using motion compensation in accordance with the present video noise reduction technique.
Figure 5B:
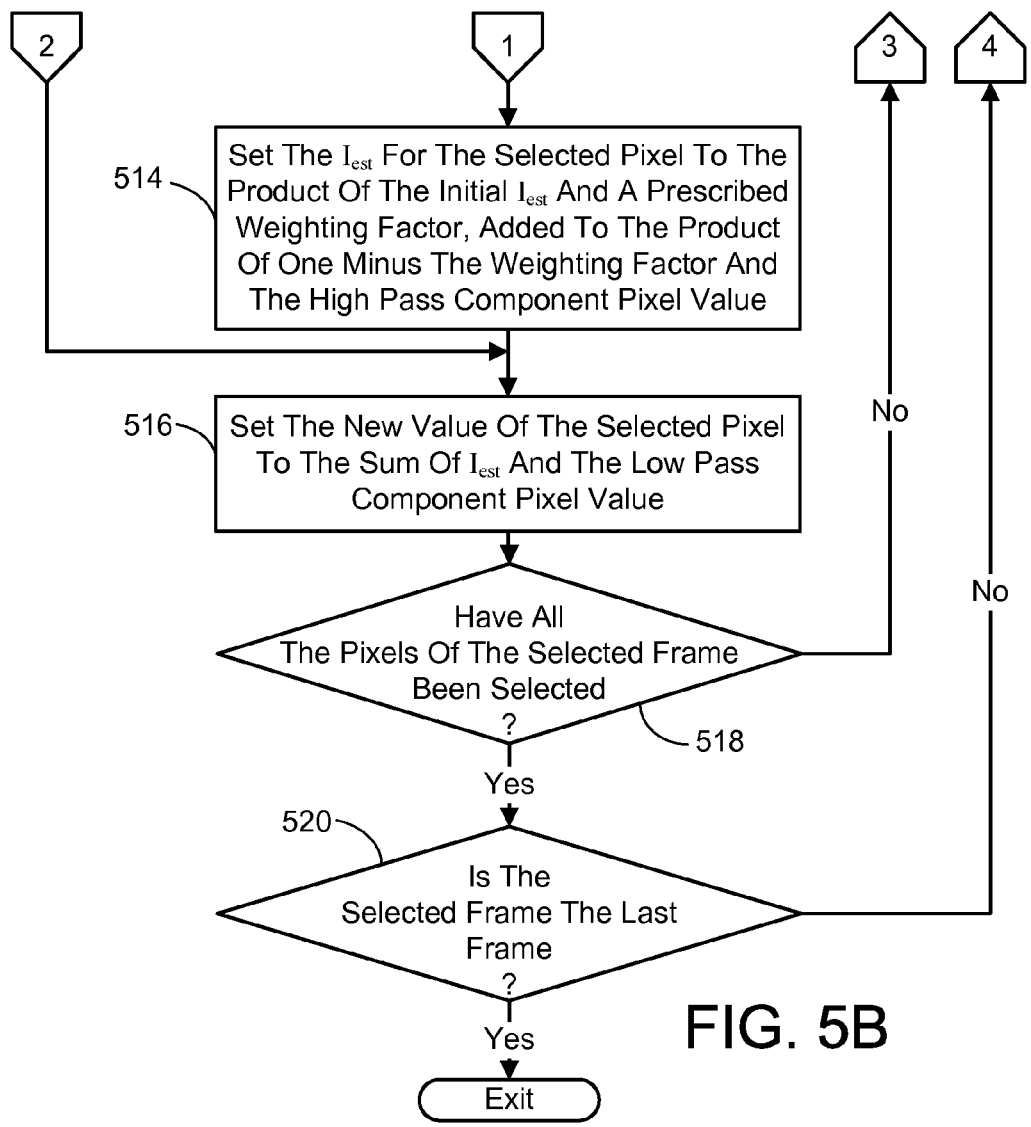

In one embodiment, this is implemented as shown in FIGS. 5A-B. First, a frame of the video is selected (500) and then decomposed into low-pass and high-pass frequency components (502). In addition, for each frame after the first reference frame, an estimate of the noise variance in the high pass component of the selected frame is obtained (504). A previously unselected pixel of the selected frame (excluding the first reference frame) is then selected (506), and it is determined if the selected pixel satisfies a first condition that the absolute value of the difference between the high pass component pixel value and an initial value of $I_{est}$ is less than a first prescribed multiple of the noise variance estimate (508). If not, the $I_{est}$ is set to the high pass component value of the selected pixel (510). If the first condition is satisfied, then it is determined whether the selected pixel satisfies a second condition that the absolute value of the difference between the low pass component associated with the frame currently under consideration and the low pass component computed for the frame immediately preceding the current frame is less than a second prescribed multiple of the noise variance estimate (512). If not, the $I_{est}$ is set to the high pass component value of the selected pixel (510). However, if the second condition is also satisfied, the $I_{est}$ for the selected pixel is set to the product of the initial $I_{est}$ and a prescribed weighting factor, added to the product of one minus the weighting factor and the high pass component pixel value (514). In this case, the initial $I_{est}$ for a pixel of the first prediction frame of the video coming immediately after the first reference frame is set to the high pass component pixel value of the pixel in the first reference frame identified as corresponding to the pixel of the first prediction frame via the set of motion vectors associated with it. In addition, the initial $I_{est}$ for a pixel of each reference frame after the first reference frame is set to the $I_{est}$ of the correspondingly-located pixel of the immediately preceding prediction frame. And finally, the initial $I_{est}$ for a pixel of each prediction frame coming after the first prediction frame is set to the $I_{est}$ of the pixel in its associated reference frame identified as corresponding to the pixel of the prediction frame under consideration via the set of motion vectors associated with it. Once the $I_{est}$ for a pixel has been computed, the current value of the selected pixel is replaced with the sum of the pixel's $I_{est}$ and the pixel's low pass component value (516). It is then determined if all the pixels of the selected frame have been selected (518). If not, actions 506 through 518 are repeated. When all the pixels have been considered, it is determined if the selected frame is the last frame (520). If it is not, the procedure is repeated by repeating actions 500 through 520. If it is the last frame, the procedure ends.

The foregoing version of the present technique is also applicable to video codecs employing bi-directional frames that are predicted from a reference frame preceding the bidirectional frame and a prediction frame coming after the bidirectional frame. This prediction is accomplished by combining a set of motion vectors from both the associated reference and prediction frames. The only difference in the present procedure is how the initial $I_{est}$ is set for a pixel of a bi-directional frame. More particularly, the initial $I_{est}$ for a pixel of the first bidirectional frame of the video coming immediately after the first reference frame is computed as the combination of the high pass component pixel value of the pixel in the first reference frame identified as corresponding to the pixel of the first bidirectional frame via the set of motion vectors associated with the first reference frame and the $I_{est}$ of the pixel of the associated prediction frame identified as corresponding to the pixel of the first bidirectional frame via the set of motion vectors associated with the prediction frame. Similarly, the initial $I_{est}$ for a pixel of each bidirectional frame coming after the first bidirectional frame is computed as a combination of the $I_{est}$ of the pixel in the associated reference frame identified as corresponding to the pixel of the bidirectional frame under consideration via the set of motion vectors associated with the reference frame and the $I_{est}$ of the pixel in the associated prediction frame identified as corresponding to the pixel of the bidirectional frame under consideration via the set of motion vectors associated with the prediction frame.

4.0 The Video Noise Reduction Technique with Backwards Updating

If the transmittal of the frames of a video can be delayed a number of frames, or if a completed video can be processed offline, it is possible to enhance the previously described embodiments of the present technique to eliminate possible ghost effects due to occluded regions. For example, assume a background wall is partially occluded by a person. If the person leaves, the previously-described first and second conditions would not be satisfied at the instance un-occlusion occurs, owing to the motion. Accordingly, no noise reduction would take place in the affected frame(s). In addition, the averaging aspects of computing an $I_{est}$ for a pixel would take a few frames to take full effect. During this period, the un-occluded region would be slightly noisier than the parts that were never occluded, creating a ghosting effect. Performing a backward updating of the $I_{est}$ values for the aforementioned period can alleviate this problem.

Figure 6A:
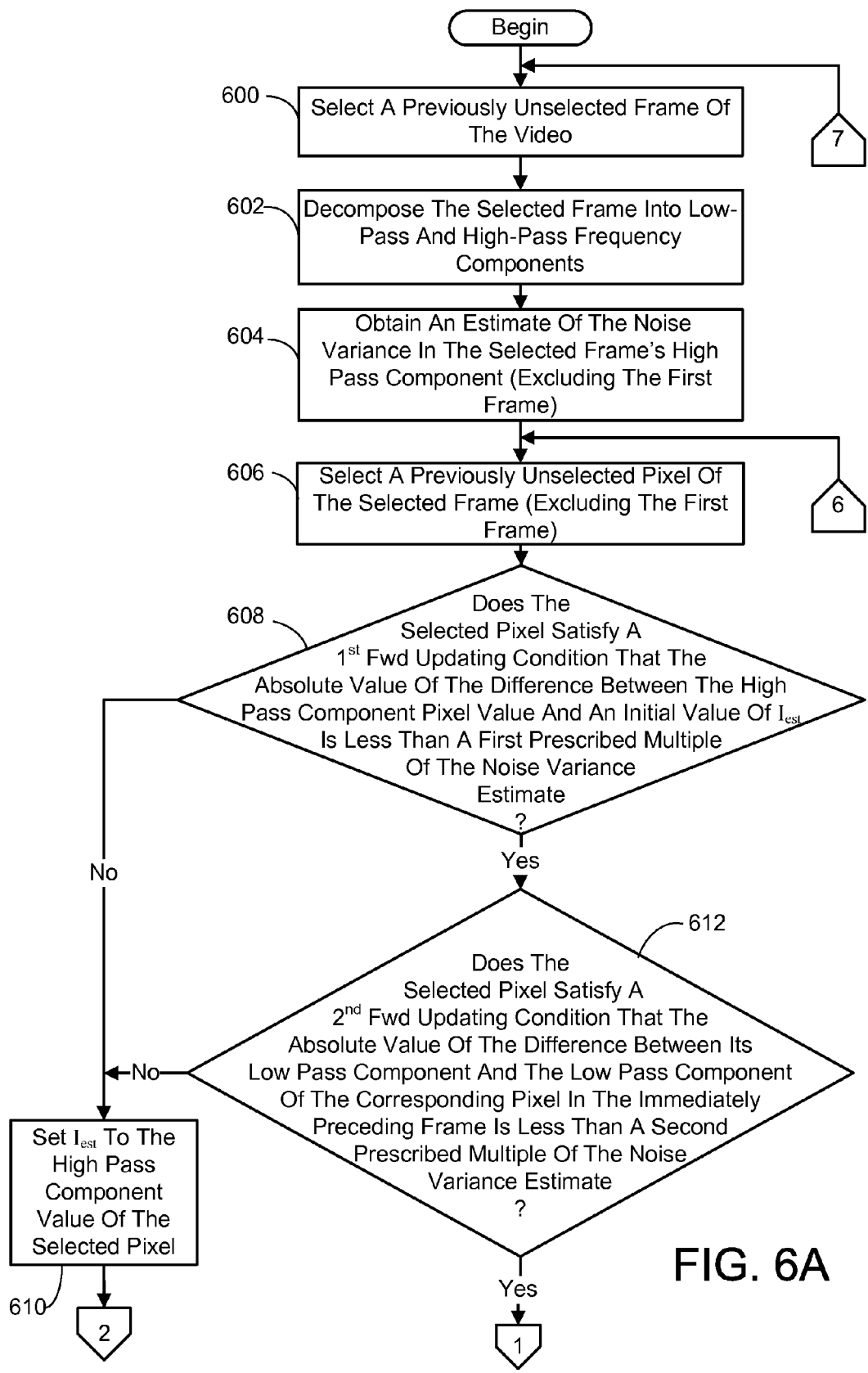
FIGS. 6A-C are a continuing flow diagram generally outlining one embodiment of a process for reducing noise in the frames of a video, which includes backward updating to alleviate ghosting caused by occlusions in accordance with the present video noise reduction technique.
Figure 6B:
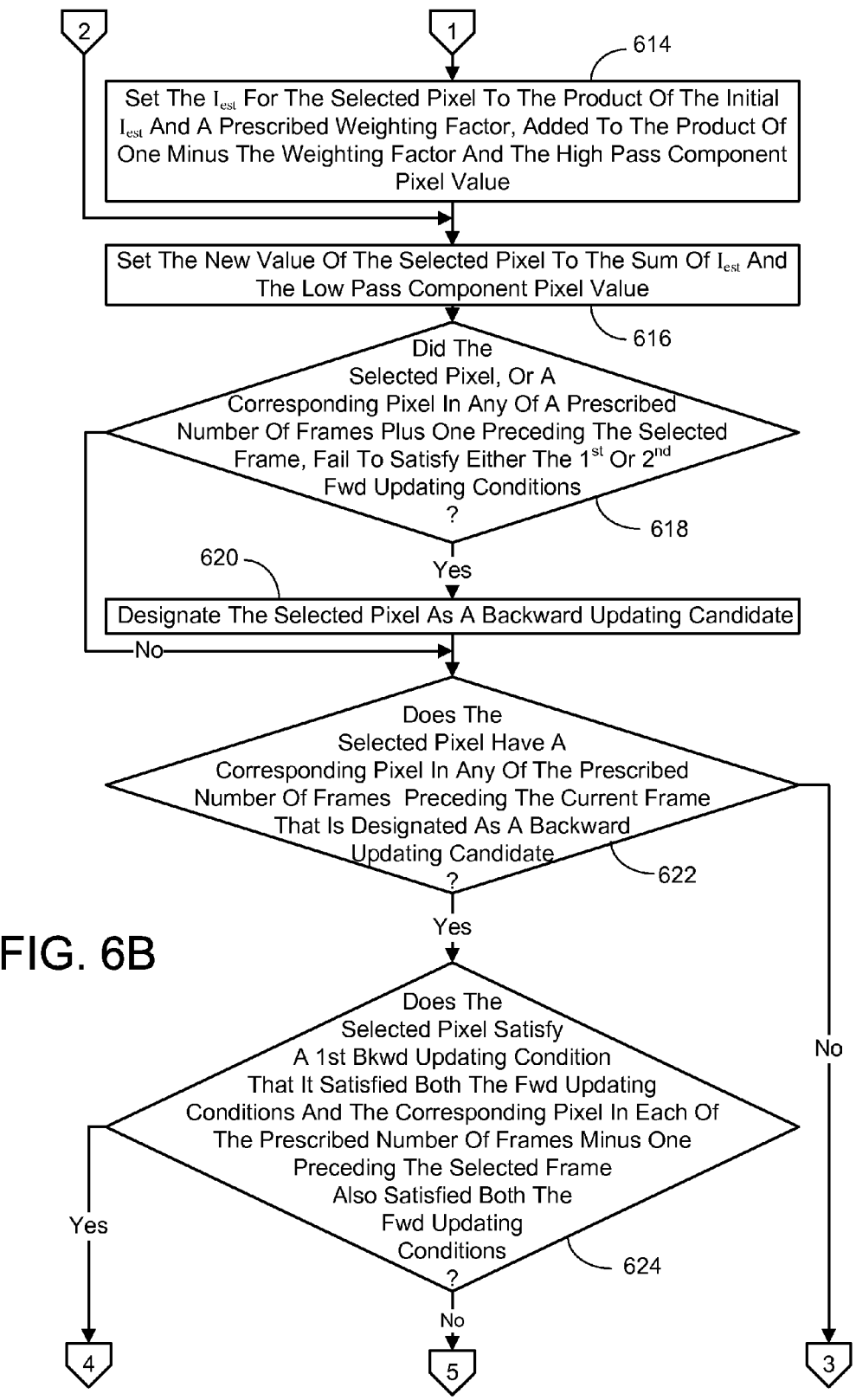
Figure 6C:
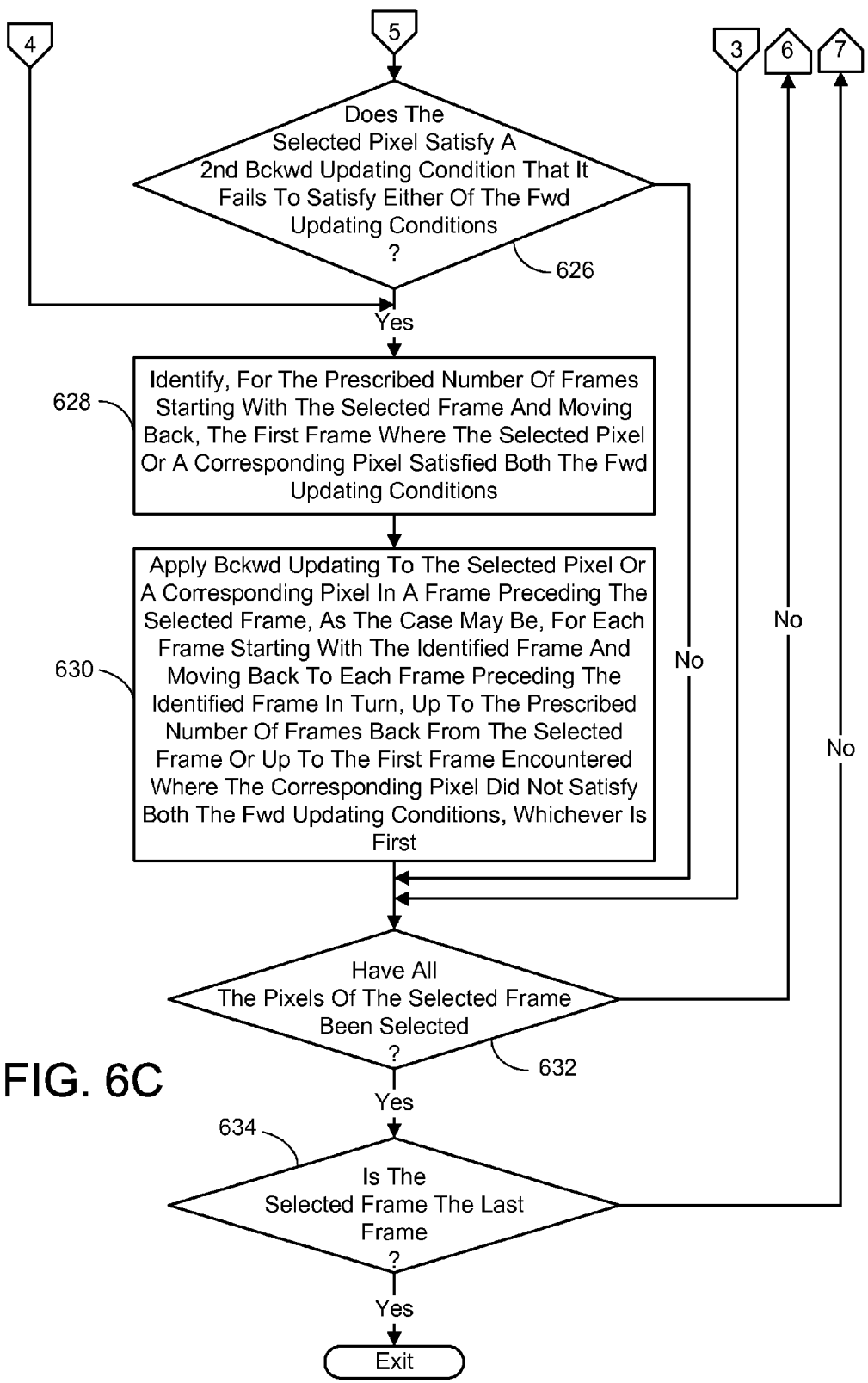

In one embodiment of the present video noise reduction technique, the backward updating is implemented as shown in FIGS. 6A-C. The noise in the frames of the video is reduced in the forward direction as described in the previous embodiments. More particularly, the procedure begins by selecting a frame of the video (600) and then decomposing the selected frame into low-pass and high-pass frequency components (602). An estimate of the noise variance in the high pass component of the selected frame is obtained for each frame after the first (604). A previously unselected pixel of the selected frame (excluding the first) is then selected (606), and it is determined if the selected pixel satisfies a first forward updating condition that the absolute value of the difference between the high pass component pixel value and an initial value of $I_{est}$ is less than a first prescribed multiple of the noise variance estimate (608). If not, the $I_{est}$ is set to the high pass component value of the selected pixel (610). If the first forward updating condition is satisfied, then it is determined whether the selected pixel satisfies a second forward updating condition that the absolute value of the difference between the low pass component associated with the frame currently under consideration and the low pass component computed for the corresponding pixel in the frame immediately preceding the current frame is less than a second prescribed multiple of the noise variance estimate (612). If not, the $I_{est}$ is set to the high pass component value of the selected pixel (610). However, if the second forward updating condition is also satisfied, the $I_{est}$ for the selected pixel is set to the product of the initial $I_{est}$ and a prescribed weighting factor, added to the product of one minus the weighting factor and the high pass component pixel value (614). Once the $I_{est}$ has been computed, the current value of the selected pixel is replaced with the sum of the pixel's $I_{est}$ and the pixel's low pass component value (616).

It is then determined whether the selected pixel, or a correspondingly-located pixel in any of a prescribed number of frames plus one in the sequence of frames preceding the selected frame, failed to satisfy either the first or second forward updating conditions (618). If so, the selected pixel is designated as a candidate for backward updating (620). If not, no action is taken. Either way, it is also determined whether the selected pixel has a correspondingly-located pixel in any of the prescribed number of frames in the sequence of frames preceding the current frame that is designated as a backward updating candidate (622). If it does not, then no backwards updating is necessary and the procedure skips to action 632. However, if it does, it is then determined if the selected pixel has satisfied a first backward updating condition in that it has satisfied both the first and second forward updating conditions and the correspondingly-located pixel in each of the prescribed number of frames minus one in the sequence of frames preceding the selected frame also satisfied both the first and second forward updating conditions (624). If this is not true, it is determined if the selected pixel has satisfied a second backward updating condition in that it fails to satisfy either the first or second forward updating conditions (626). Otherwise, action 626 is skipped. If it is determined the selected pixel satisfied either the first or second backward updating condition, then for the prescribed number of frames starting with the selected frame and moving back in the sequence of frames preceding the selected frame, the first frame where the selected pixel or a correspondingly-located pixel in a preceding frame satisfied both the first and second forward updating conditions, is identified (628). If neither backward updating condition is satisfied, no backwards updating is done and the procedure skips to action 632. Next, for each frame starting with the identified frame and moving back to each frame preceding the identified frame in turn, up to the prescribed number of frames back from the selected frame or up to the first frame encountered where the correspondingly-located pixel did not satisfy both the first and second forward updating conditions, whichever is first, backward updating is applied to the selected pixel or a correspondingly-located pixel in a frame preceding the selected frame, as the case may be (630). It is then determined if all the pixels of the selected frame have been selected (632). If not, actions 606 through 632 are repeated. When all the pixels in the selected frame have been considered, it is determined if the selected frame is the last frame (634). If it is not, the procedure is repeated by repeating actions 600 through 634. If it is the last frame, the procedure ends.

As for the prescribed number of frames that the foregoing procedure looks back, in one embodiment, the number is fixed. For example, in tested embodiments, the prescribed number of frames was set to 10 frames. It is noted, however, that each frame included in the prescribed number of frames results in a measurable amount of improvement in a pixel's signal-to-noise ratio. Thus, it is possible in an alternate embodiment to set the prescribed number of frames to the number of frames that will produce the improvement in the signal-to-noise ratio needed to achieve a target ratio.

Figure 7:
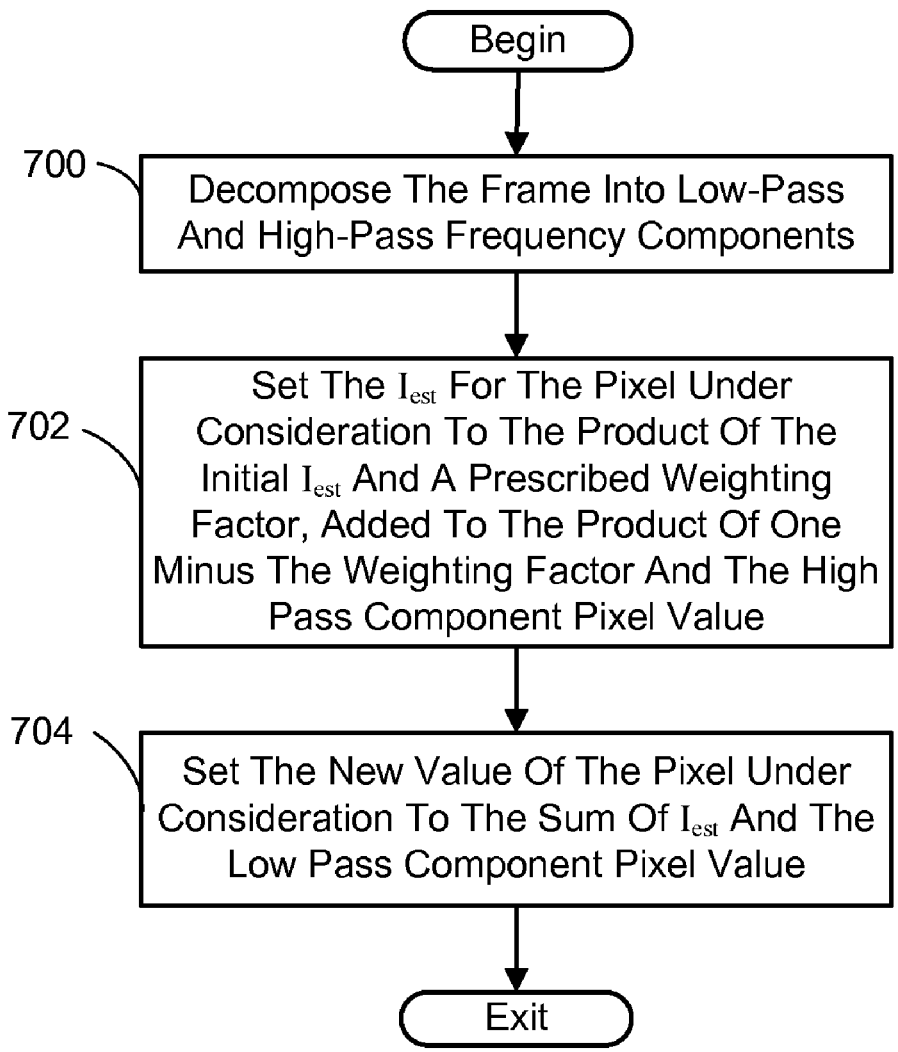
FIG. 7 is a flow diagram generally outlining one embodiment of a process for backward updating which can be employed as part of the present video noise reduction technique.

As for the backward updating task, this is generally just the present video noise reduction technique applied in a reverse order of frames. More particularly, referring to FIG. 7, the backward updating task involves first decomposing the pixel under consideration into low-pass and high-pass frequency components (700). The $I_{est}$ of the pixel is then set to a value representing the product of the pixel's initial $I_{est}$ and the aforementioned prescribed weighting factor, added to the product of one minus the weighting factor and the high pass component pixel value (702). Here again, the initial $I_{est}$ for a pixel is set to the $I_{est}$ of the correspondingly-located pixel of the frame considered immediately before the current frame under consideration. Next, the current pixel value of the pixel is replaced with a pixel value representing the sum of the pixel's new $I_{est}$ and its low pass component pixel value (704).

5.0 Other Embodiments

In the foregoing description of the embodiments of the present video noise reduction technique, the pixel intensity was referred to as if it were a single entity. This is true in the case of gray scale images. However, in color video frames, each pixel intensity is actually a combination of individual color intensities. For example, when a Red-Green-Blue (RGB) color model is used to characterize the pixel color, there is a red color channel intensity, green color channel intensity and blue color channel intensity. In view of this, when the noise in a color video frame is being reduced, the present technique involves repeating the foregoing noise reduction procedures for each color channel. It is further noted that this repetition of the procedures per color channel also applies to other color models and color space characterizations of the pixel intensities.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for reducing noise in a video comprising a sequence of video frames, comprising using a computer to perform the following process actions:
  decomposing each frame of the video into low-pass and high-pass frequency components,
  for each frame of the video after the first,
    obtaining an estimate of the noise variance in the high pass component, and
    on a per pixel basis, reducing the noise in the high pass component using the noise variance estimate whenever there has been no substantial motion since the last previous frame as determined by analyzing the high and low pass components, and the pixel under consideration satisfies a set of conditions comprising whether the pixel under consideration satisfies a first condition that the absolute value of the difference between the high pass component pixel value and an initial value of $I_{est}$ is less than a first prescribed multiple of the noise variance estimate, wherein $I_{est}$ represents an estimate of the high pass component intensity of the pixel under consideration as it would exist without noise.

2. The process of claim 1, wherein the process action of reducing the noise in the high pass component using the noise variance estimate on a per pixel basis, further comprises an action of ensuring that the pixel under consideration also satisfies a second condition that the absolute value of the difference between the low pass component associated with the frame currently under consideration and the low pass component computed for the frame immediately preceding the current frame is less than a second prescribed multiple of the noise variance estimate.

3. The process of claim 2, wherein the first prescribed multiple of the noise variance estimate ranges between about 3 and about 5, and the second prescribed multiple of the noise variance estimate ranges between about 0.5 and about 2.0.

4. The process of claim 2, wherein the first prescribed multiple of the noise variance estimate is 5, and the second prescribed multiple of the noise variance estimate is 1.25.

5. The process of claim 2, wherein the initial $I_{est}$ for a pixel of the second frame of the video is set to the high pass component pixel value of the correspondingly-located pixel in the first frame and the initial $I_{est}$ for a pixel of each frame after the second frame of the video is set to the $I_{est}$ of the correspondingly-located pixel of the immediately preceding frame, and wherein the process action of reducing the noise in the high pass component using the noise variance estimate on a per pixel basis, further comprises the actions of:
  for each pixel of the video frame under consideration,
    setting the $I_{est}$ to a value representing the product of the initial $I_{est}$ and a prescribed weighting factor, added to the product of one minus the weighting factor and the high pass component pixel value, whenever the first and second conditions are satisfied, and
    setting the $I_{est}$ to the high pass component pixel value, whenever either the first or second condition is not satisfied,
    replacing the current pixel value with a pixel value representing the sum of the $I_{est}$ and the low pass component pixel value.

6. The process of claim 5, wherein the process action of obtaining the estimate of the noise variance in the high pass component for each frame of the video after the first, comprises the actions of:
  for each video frame after the first frame,
    computing the square of the difference between the $I_{est}$ and the high pass component pixel value, for each pixel where the first and second conditions are satisfied,
    computing a mean square difference from the squares of the differences computed for the pixels where the first and second conditions were satisfied,
    setting the noise variance estimate to a prescribed value for the second frame of the video, and
    setting the noise variance estimate to a value representing the square root of said mean square difference computed for the immediately preceding video frame, for each frame after the second frame of the video.

7. The process of claim 6, wherein the prescribed initial value of the current noise variance estimate is 10.

8. The process of claim 5, wherein the prescribed weighting factor is set to N/(N+1), wherein N is the number of video frames including the current frame back to the last video frame where the pixel under consideration does not satisfy both the first and second conditions.

9. The process of claim 5, wherein the prescribed weighting factor is set to a fixed value of ⅞.

10. The process of claim 1, wherein the process action of decomposing the video frame into low-pass and high-pass frequency components, comprises the actions of:
  generating the low pass component using a low pass filter; and
  generating the high pass component by subtracting the low pass component from the video frame under consideration.

11. The process of claim 10, wherein the low pass filter is one of (i) a box filter, and (ii) a Gaussian filter.

12. The process of claim 1, wherein each frame of the video is a color frame and the intensity value of each pixel comprises a combination of the individual intensity of each of a group of color channels, and wherein all the process actions are performed separately on each color channel.

13. A computer-implemented process for reducing noise in a video comprising a sequence of video frames, comprising using a computer to perform the following process actions:
  decomposing each frame of the video into low-pass and high-pass frequency components,
  for each frame of the video after the first,
    obtaining an estimate of the noise variance in the high pass component, and
    on a per pixel basis, reducing the noise in the high pass component using the noise variance estimate whenever the pixel under consideration satisfies a set of conditions comprising,
      a first forward updating condition that the absolute value of the difference between the high pass component pixel value and an initial value of $I_{est}$ is less than a first prescribed multiple of the noise variance estimate, wherein $I_{est}$ represents an estimate of the high pass component intensity of the pixel under consideration as it would exist without noise, and
      a second forward updating condition that the absolute value of the difference between the low pass component associated with the frame currently under consideration and the low pass component computed for the frame immediately preceding the current frame is less than a second prescribed multiple of the noise variance estimate.

14. The process of claim 13, further comprising a process action of performing a backward updating operation for pixels in a group of frames, wherein the backward updating operation comprises the actions of:
  whenever a pixel under consideration in the current frame under consideration fails to satisfy either the first or second forward updating conditions or a correspondingly-located pixel in any of a prescribed number of frames plus one in the sequence of frames preceding the current frame under consideration fails to satisfy either the first or second forward updating conditions, designating the pixel under consideration as a candidate for backward updating; and
  whenever a pixel under consideration in the current frame under consideration has a correspondingly-located pixel in any of the prescribed number of frames in the sequence of frames preceding the current frame that is designated as a backward updating candidate,
    determining if the pixel under consideration has satisfied a first backward updating condition in that it has satisfied both the first and second forward updating conditions and the correspondingly-located pixel in each of the prescribed number of frames minus one in the sequence of frames preceding the current frame under consideration also satisfied both the first and second forward updating conditions,
    whenever the pixel under consideration fails to satisfy the first backward updating condition, determining if the pixel under consideration has satisfied a second backward updating condition in that it fails to satisfy either the first or second forward updating conditions, and
    whenever the pixel under consideration satisfies either the first or second backward updating condition,
      identifying the prescribed number of frames starting with the current frame and moving backward in the sequence of frames preceding the current frame, identifying the first frame wherein the pixel under consideration or a correspondingly-located pixel in a preceding frame satisfied both the first and second forward updating conditions, in the identified prescribed number of frames, and applying backward updating to the pixel under consideration or a correspondingly-located pixel in a frame preceding the current frame, as the case may be, for the identified first frame and each frame preceding the identified first frame in the identified prescribed number of frames, in turn, up to the first frame encountered where the correspondingly-located pixel did not satisfy both the first and second forward updating conditions, wherein backward updating of the pixel under consideration or a correspondingly-located pixel in a frame preceding the current frame comprises, decomposing the pixel under consideration into low-pass and high-pass frequency components, setting the $I_{est}$ of the pixel under consideration to a value representing the product of an initial $I_{est}$ and a prescribed weighting factor, added to the product of one minus the weighting factor and the high pass component pixel value, wherein the initial $I_{est}$ for a pixel is set to the $I_{est}$ of the correspondingly-located pixel of the frame immediately preceding the current frame under consideration, and replacing the current pixel value of the pixel under consideration with a pixel value representing the sum of the $I_{est}$ and the low pass component pixel value.

15. The process of claim 14, wherein the prescribed weighting factor is set to a fixed value of ⅞.

16. The process of claim 14, wherein the prescribed number of frames is set to 10 frames.

17. The process of claim 14, wherein the prescribed weighting factor is set to N/(N+1), wherein N is the number of video frames including the current frame back to the last video frame where the pixel under consideration does not satisfy both the first and second conditions.

18. The process of claim 16, wherein each frame included in the prescribed number of frames results in a known amount of improvement in a pixel's signal-to-noise ratio, and wherein the prescribed number of frames is set to the number of frames that will produce improvement in the signal-to-noise ratio needed to achieve a target ratio.

19. A computer-implemented process for reducing noise in a video comprising a sequence of video frames comprising reference frames and predicted frames that are predicted from an associated reference frame using a set of motion vectors and residue values, comprising using a computer to perform the following process actions:

decomposing each frame into low-pass and high-pass frequency components;

for each frame after the first reference frame, obtaining an estimate of the noise variance in the high pass component, and on a per pixel basis, determining whether the pixel under consideration satisfies a set of conditions comprising, a first condition that the absolute value of the difference between the high pass component pixel value and an initial value of $I_{est}$ is less than a first prescribed multiple of the noise variance estimate, wherein $I_{est}$ represents an estimate of the high pass component intensity of the pixel under consideration as it would exist without noise, and a second condition that the absolute value of the difference between the low pass component associated with the frame currently under consideration and the low pass component computed for the frame immediately preceding the current frame is less than a second prescribed multiple of the noise variance estimate, and for each pixel of the video frame under consideration, setting the $I_{est}$ to a value representing the product of the initial $I_{est}$ and a prescribed weighting factor, added to the product of one minus the weighting factor and the high pass component pixel value, whenever the first and second conditions are satisfied, wherein the initial $I_{est}$ for a pixel of a first prediction frame of the video coming immediately after the first reference frame is set to the high pass component pixel value of the pixel in the first reference frame identified as corresponding to the pixel of the first prediction frame via the set of motion vectors associated therewith, and the initial $I_{est}$ for a pixel of each reference frame after the first reference frame is set to the $I_{est}$ of the correspondingly-located pixel of the immediately preceding prediction frame, and the initial $I_{est}$ for a pixel of each prediction frame coming after the first prediction frame is set to the $I_{est}$ of the pixel in its associated reference frame identified as corresponding to the pixel of the prediction frame under consideration via the set of motion vectors associated therewith;

setting the $I_{est}$ to the high pass component pixel value, whenever either the first or second condition is not satisfied, and replacing the current pixel value with a pixel value representing the sum of the $I_{est}$ and the low pass component pixel value.

20. The process of claim 19, wherein the sequence of video frames further comprises bidirectional frames that are predicted from an associated reference frame preceding the bidirectional frame and an associated prediction frame coming after the bidirectional frame, using a set of motion vectors from both the associated reference and prediction frames, and wherein the process action of setting, for each pixel of the video frame under consideration, the $I_{est}$ to a value representing the product of an initial $I_{est}$ and a prescribed weighting factor, added to the product of one minus the weighting factor and the high pass component pixel value, whenever the first and second conditions are satisfied, further comprises, in the case of a bidirectional frame:

computing the initial $I_{est}$ for a pixel of a first bidirectional frame of the video coming immediately after the first reference frame as a combination of the high pass component pixel value of the pixel in the first reference frame identified as corresponding to the pixel of the first bidirectional frame via the set of motion vectors associated with the first reference frame and the $I_{est}$ of the pixel of the associated prediction frame identified as corresponding to the pixel of the first bidirectional frame via the set of motion vectors associated with the prediction frame; and computing the initial $I_{est}$ for a pixel of each bidirectional frame coming after the first bidirectional frame as a combination of the $I_{est}$ of the pixel in the associated reference frame identified as corresponding to the pixel of the bidirectional frame under consideration via the set of motion vectors associated with the reference frame and the $I_{est}$ of the pixel in the associated prediction frame identified as corresponding to the pixel of the bidirectional frame under consideration via the set of motion vectors associated with the prediction frame.

\* \* \* \* \*